US007057686B2

(12) United States Patent
Ho et al.

(10) Patent No.: US 7,057,686 B2
(45) Date of Patent: *Jun. 6, 2006

(54) LIQUID CRYSTAL STRUCTURE WITH IMPROVED BLACK STATE, AND PROJECTOR USING SAME

(75) Inventors: Kenneth C. Ho, Yonkers, NY (US); Minhua Lu, Mohegan Lake, NY (US); Alan E. Rosenbluth, Yorktown Heights, NY (US); Kei-Hsiung Yang, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/897,456

(22) Filed: Jul. 23, 2004

(65) Prior Publication Data

US 2005/0001958 A1 Jan. 6, 2005

Related U.S. Application Data

(62) Division of application No. 09/260,869, filed on Mar. 2, 1999, now Pat. No. 6,798,475.

(51) Int. Cl.
*G02F 1/1335* (2006.01)
(52) U.S. Cl. .......................... 349/113; 349/5
(58) Field of Classification Search ............. 349/5–9, 349/113, 146–147
See application file for complete search history.

(56) References Cited

U.S. PATENT DOCUMENTS

| | | | |
|---|---|---|---|
| 3,728,007 A | 4/1973 | Myrenne et al. | |
| 3,914,022 A | 10/1975 | Kashnow | |
| 5,565,933 A | * 10/1996 | Reinsch | 348/742 |
| 5,646,705 A | 7/1997 | Higuchi et al. | |
| 5,706,066 A | 1/1998 | Sawayama et al. | |
| 5,745,201 A | 4/1998 | Kawai et al. | |
| 5,936,697 A | * 8/1999 | Yang | 349/180 |
| 6,084,650 A | 7/2000 | Sekiguchi | |
| 6,144,430 A | 11/2000 | Kuo | |

(Continued)

FOREIGN PATENT DOCUMENTS

JP 02-272425 11/1990

(Continued)

OTHER PUBLICATIONS

Bone, et al., "Novel Optical System Design for Reflective CMOS Technology", Strategic Display Symposium, MI, pp. 42-43 (1998).

(Continued)

*Primary Examiner*—Dung T. Nguyen
(74) *Attorney, Agent, or Firm*—Scully, Scott, Murphy & Presser, P.C.; Robert M. Trepp, Esq.

(57) ABSTRACT

A liquid crystal (LC) lightvalve comprising a twisted nematic LC layer whose molecules are aligned with pixel edges at the mirror backplane, thereby providing improved contrast and efficiency, and reduced visibility of post spacers in black state. The present invention is directed to an LC structure wherein the backplane is rubbed in a direction rectilinear with pixel edges. The LC layer is given the same twist rotation and birefringence as in the conventional TN lightvalve. Polarization control is maintained by illuminating the lightvalve with light whose polarization is rotated by the twist angle relative to the x,y, pixel axes, and by collecting the orthogonally polarized component of the reflected light. The lightvalve top glass is thus rubbed in a direction which is rotated by the twist angle from the horizontal or vertical direction at which the backplane is rubbed.

12 Claims, 15 Drawing Sheets

U.S. PATENT DOCUMENTS

| | | |
|---|---|---|
| 6,147,735 A | 11/2000 | Yamazaki et al. |
| 6,227,670 B1 * | 5/2001 | Numazaki et al. ............ 353/31 |
| 6,285,431 B1 | 9/2001 | Lyu et al. |
| 6,429,906 B1 * | 8/2002 | Sekine et al. .................. 349/9 |
| 6,798,475 B1 * | 9/2004 | Ho et al. ..................... 349/113 |

FOREIGN PATENT DOCUMENTS

| | | |
|---|---|---|
| JP | 04-223436 | 8/1992 |
| JP | 05-100226 | 4/1993 |
| JP | 07-294936 | 11/1995 |
| JP | 08-292438 | 11/1996 |
| JP | 08-334770 | 12/1996 |
| JP | 11-194342 | 7/1999 |
| JP | 11-295718 | 10/1999 |

OTHER PUBLICATIONS

Rosenbluth, "Process to Provide Unit-Index Films in Multilayer Interference Coatings", IBM Tech. Disc. Bul., vol. 32, No. 7, pp. 57-59 (1989).

Li, et al., "LP-D: Late-News Poster: High-Efficiency LCD Projection Displays with Novel Thin-Film Polarizing Beam Splitters", SID 98 Digest: pp. 686-689 (1998).

* cited by examiner

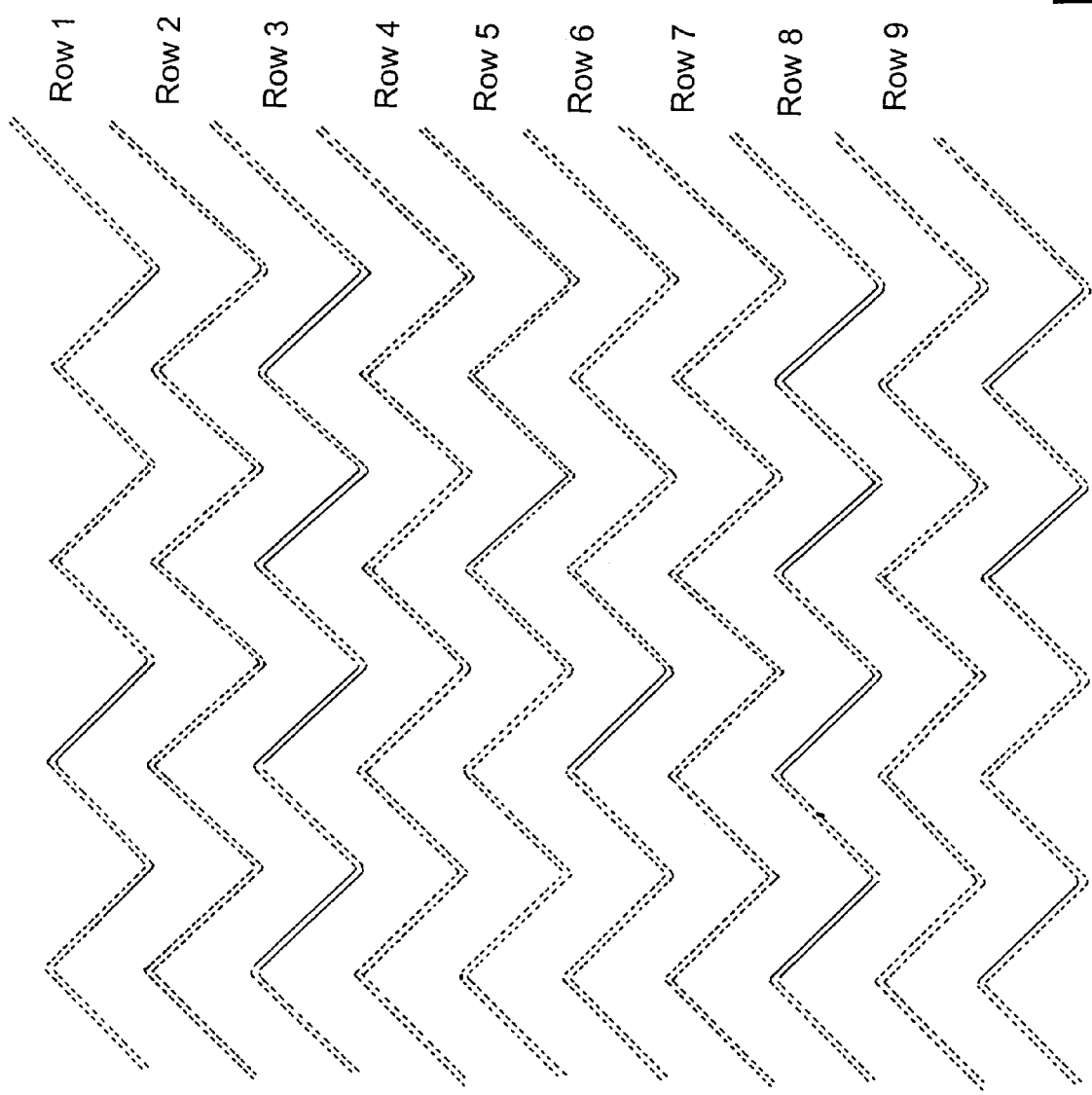

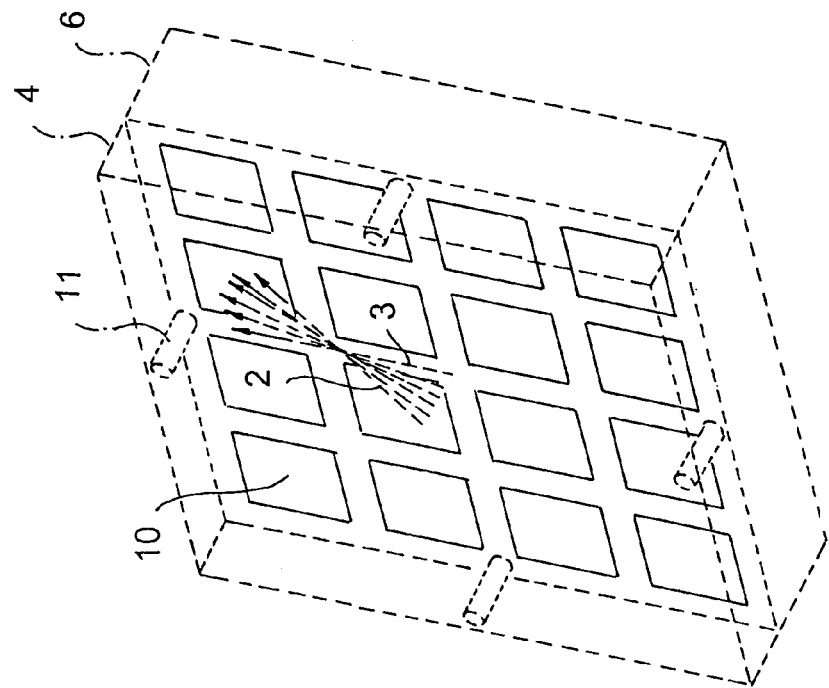
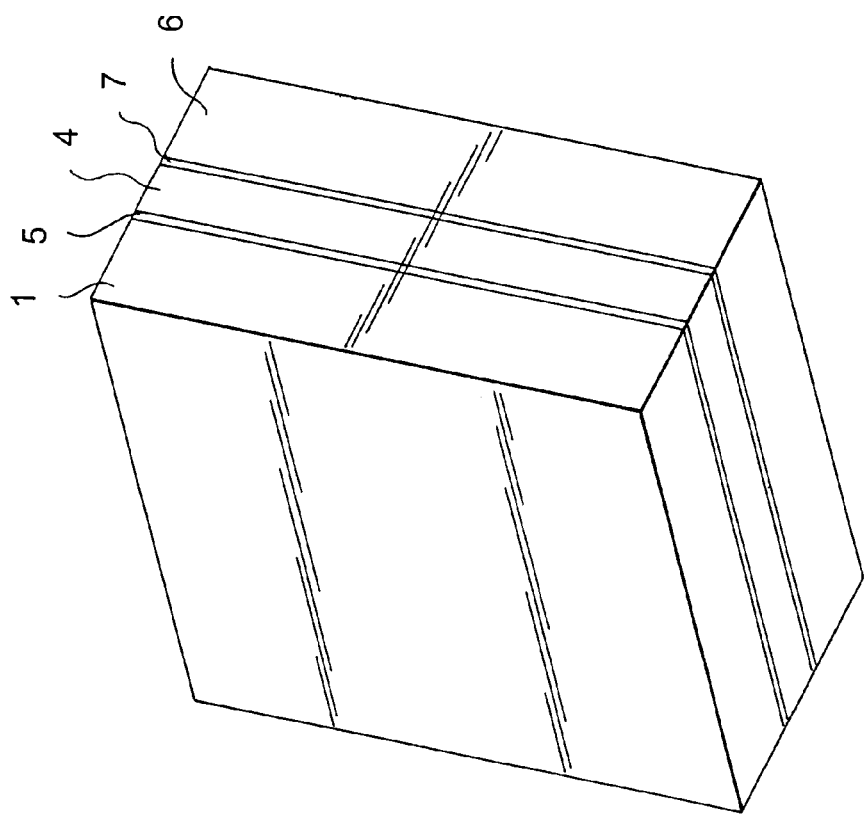
Figure 5b
Figure 5a

LIQUID CRYSTAL STRUCTURE WITH IMPROVED BLACK STATE, AND PROJECTOR USING SAME

RELATED APPLICATIONS

This application is a divisional of U.S. application Ser. No. 09/260,869, filed Mar. 2, 1999 now U.S. Pat. No. 6,798,475.

FIELD OF THE INVENTION

The present invention is directed to reflective liquid crystal (LC) lightvalves comprising a twisted nematic LC layer whose molecules are aligned with pixel edges at the mirror backplane, resulting in improved contrast and reduced visibility of post spacers in black state.

PRIOR ART

Reflection lightvalves are becoming widely popular for use in projection displays. Such lightvalves can be reduced in size with relatively little loss in pixel aperture, allowing a corresponding shrinkage in size and cost of the projection system. Reflective lightvalves based on twisted nematic liquid crystal (TNLC) layers, such as the 45° C. twist or 54° C. twist modes, make use of well developed LC technology, and with relatively modest driving voltages can provide a reasonably satisfactory optical response when reproducing black, white or intermediate grayshaded image regions; however, the image appearance in black state exhibits certain imperfections which will now be described. Conventionally, the above described systems are illuminated with light that is polarized in a direction that is rectilinear with the x,y axes of lightvalve pixels, i.e. the incident e-field is parallel or perpendicular to the pixel edges. The e-field at the mirror backplane is then rotated by the twist angle relative to this incident direction, e.g., the polarization at the backplane will be rotated by 45° or 54° relative to the pixel edges.

The topography of the backplane typically comprises vertical and horizontal mirror electrode edges, the pixel mirrors being laid out in a row, column fashion to provide the pixels of the projected image. When a conductor like these pixel electrodes is illuminated by an electromagnetic (E&M) field, currents are set up along its boundaries, giving rise to scattered radiation. When the edges are straight the polarization eigenstates of the scattered radiation are approximately rectilinear with these edges. If the input polarization is not one of these eigenstates, e.g., if it is in a rotated orientation, the scattered light will tend to be depolarized by the edges. In order to avoid depolarization from scattering by pixel electrode topography, it would be highly desirable to have the polarization at the backplane be horizontal or vertical, instead of oriented at e.g. 45° or 54°. Such depolarization adds unwanted light to the black state image, and removes useful light from the white state image. The pixels that produce this scattered light have the same periodicity as the diffraction orders which carry the image information, making it impossible to remove the depolarized light by spatial filtering, as might otherwise be possible if a laser illumination source were used.

The most common manufacturing process for establishing the orientation of the LC molecules at the backplane is through rubbing of an alignment layer. This rubbing process creates artifacts when the lightvalve cell gap is maintained by spacer posts placed in the boundaries between mirror pixels. The principle advantage of spacer post technology is that it provides very accurate control of cell gap; however a disadvantage is that spacer posts perturb the alignment of nearby LC. Incident light whose polarization is altered by that portion of the disturbed LC which is immediately adjacent to the posts will largely be absorbed by the low reflectivity layer that separates the pixel mirrors; thus, in regions very close to the posts, the disturbed LC has little effect on the displayed image. Unfortunately, the region of disturbed LC may be considerably extended (~10 μm) in the direction of alignment layer rubbing. In the known reflective TN lightvalves this rubbing direction is at an angle such as 45° to the dark inter-pixel boundaries, creating visible LC disturbance in the regions over the mirrors.

SUMMARY OF THE INVENTION

The present invention is directed to a liquid crystal (LC) structure wherein the backplane is rubbed in a direction rectilinear with pixel edges. The LC layer is given the same twist rotation and birefringence as in the conventional TN lightvalve. Polarization control is maintained by illuminating the lightvalve with light whose polarization is rotated by the twist angle relative to the x,y, pixel axes, and by collection of the orthogonally polarized component of the reflected light. The lightvalve top glass is thus rubbed in a direction which is rotated by the twist angle from the horizontal or vertical direction at which the backplane is rubbed.

Moreover, in the present invention, several methods are disclosed to provide illumination, and collection in the desired polarization directions: First, light may be introduced through a polarizing beamsplitter (PBS) or 1-PBS, e.g., PBS+plumbicon prisms, optics which are rotated so as to place the P plane of the PBS hypotenuse coating into an orientation where its intersection with the lightvalve plane is rectilinear with the desired illumination polarization.

Second, a tilted DBEF beamsplitter may be used, with pass axis rotated within the substrate plane to the angle of the desired collection polarization, or to the perpendicular angle. DBEF beamsplitter is a product of 3M Corporation.

Third, an existing optical system in which light is obliquely incident through one polarizer onto the lightvalve, and in which light is collected through an offset orthogonal polarizer, may be utilized but with rotators such as halfwave rotators placed between the color dichroics and the linear polarizers.

Fourth, a PBS or 1-PBS set of optics in the conventional orientation may be used, with a precision achromatic halfwave retarder placed between the optics and the lightvalve.

Fifth, a PBS or 1-PBS set of optics may be used in the conventional orientation, together with a twist layer to rotate the input polarization.

Sixth, a PBS or 1-PBS set of optics may be used in the conventional orientation, together with an optically active layer to rotate the input polarization.

The foregoing embodiments of the invention described above involve rotation of the input polarization and LC structure into an orientation that is aligned with the horizontal/vertical edges of the unrotated pixel electrodes. An additional class of embodiments is possible wherein the edges of pixel electrodes are rotated into alignment with an LC structure that is kept in the conventional orientation.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which:

FIGS. 2b,c,d further illustrate the row and column layouts of the pixel electrodes of FIG. 2a;

FIGS. 5a and 5b are schematic illustrations of the lightvalve structure in the preferred embodiment of the present invention;

DETAILED DESCRIPTION OF THE PREFERRED EMBODIMENT OF THE INVENTION

Figure 1:
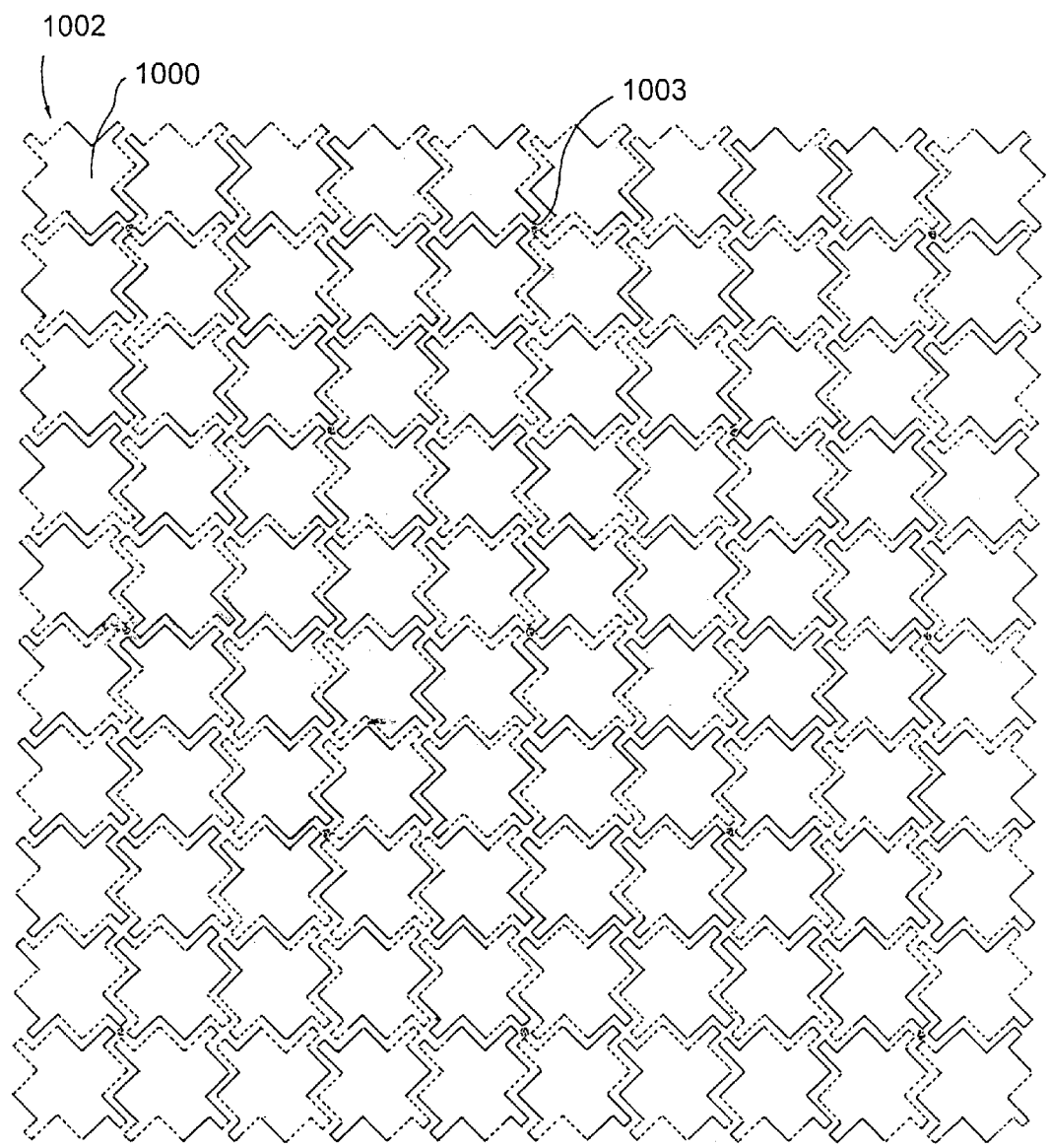
FIG. 1 shows an x,y grid of electrodes 1000 which are formed from serrated edges such as 1002 composed of segments oriented at 45° and 135°.

FIGS. 5a and 5b are schematic illustrations of the lightvalve structure in the preferred embodiment of the present invention. FIG. 5a shows a liquid crystal layer 4 held between transparent top substrate 1 and bottom substrate 6. The orientation of the liquid crystal molecules is determined by alignment layers 5 and 7. FIG. 5b shows the interior of lightvalve structure shown in FIG. 5a, i.e., without the top substrate (FIG. 5a at 1). Reflective pixel electrodes 10 are positioned at the bottom of LC layer 4. The spacing between the top and bottom substrates (FIG. 5a at 1 and 6) is maintained by posts 11. The LC molecular orientation is shown schematically by a series of arrows, beginning with arrow 2 at the upper surface of the LC layer 4 and ending with arrow 3 at the bottom. The twisting orientation of the arrows from top to bottom represents the LC twist. At the bottom substrate 6 the LC molecular axes and rubbing direction are aligned with the edges of pixel electrodes 10, except for a small pretilt of the molecules above the backplane surface. The arrows actually represent the projection of the LC director onto horizontal planes. The input polarization is either parallel or perpendicular to the projected LC director at the top substrate 1. Here the LC director at a given depth in the LC can be considered to be the field direction, tilted slightly out of the backplane, at which the refractive index of the extraordinary ray is an extremum.

The improved black state in the lightvalve of the present invention can be evidenced in photographs of the pixel electrodes in a conventional lightvalve and a lightvalve of the present invention, viewed between crossed polarizer.

To achieve the desired results, the present invention includes two classes of embodiments. In the first class of embodiments, the optics, i.e., polarization is rotated relative to the conventional system. In this class of embodiments, the liquid crystal layer is rotated with the polarization but the pixels are left unchanged. In the second class of embodiments, the pixel edge configuration is modified, e.g., by including serrated edges or rotating the orientation of the edges.

In the first preferred embodiment, polarization is rotated relative to the conventional optics systems. There are a number of optical configurations which allow illumination and collection in the desired polarization directions as described previously and will be described in greater detail herein below.

Most prior art projection systems use a polarizing beam splitter (PBS) to separate the image forming beam from the incident illumination. The simplest such systems use a single lightvalve and PBS; the lightvalve is adjacent to one face of the PBS, and the PBS cube is oriented in such a way that its external edges are rectilinear with the x,y axes of the pixel image grid.

A single lightvalve projection system according to the present invention is obtained by orienting the PBS in a rotated nonhorizontal orientation as will be described in detail with reference to FIG. 7. In this way the desired illumination polarization is obtained; two edges of the cube face adjacent to the lightvalve are then aligned with the LC orientation at the lightvalve entrance face. For example, a 45° twist lightvalve can be oriented with horizontal and vertical pixel axes as usual, while an adjacent PBS cube is rotated to an orientation at 45° from the horizontal. The PBS must be larger than usual in order that its width span the lightvalve diagonal. It should be understood that the twist angle may not be 45°, and the lightvalve may be rectangular instead of square with the PBS as a corresponding rectangular prism. For all such configurations, the size of the PBS must generally be increased.

A similar layout may be used in projectors that use two lightvalves with a single PBS. In such layouts the PBS is preferably one of the newer types known to the persons skilled in the art and which provides high contrast in both arms of the PBS, for example those based on frustrated total internal reflection. Such systems are disclosed in L. Li et al., "High Efficiency Projection Displays Having Thin Film Polarizing Beam-Splitters," World Patent WO9807279 (1998), L. Li and J. Dobrowolski, "Thin Film Polarizing Device," World Patent WO9707418 (1997) and A. E. Rosenbluth, "Use of Air Spaces as Unit-Index Films in Large Bandwidth Interference Coatings," IBM Technical Disclosure Bulletin 12–89 (1989), p. 57–59.

Projectors that use three lightvalves require prism assemblies for beam division/recombination that are more complicated than a simple PBS. Such a multi-element prism assembly for prior art lightvalves can be transformed into a layout suitable for lightvalves of the present invention by the following procedure. Generally, one or more of the lightvalves is positioned in such a way that its surface normal passes through the center of one PBS. The illuminating polarization can be made to rotate into the orientation appropriate to the lightvalves of the present invention by rotating the optical system about this axis, i.e. by rot-ting the system about the lightvalve surface normal through an angle equal to the twist angle, e.g., 45°, leaving the lightvalve orientation unchanged. The second and third lightvalves are then repositioned in front of the appropriate faces of the rotated optical system, the faces having been displaced by the rotation, and they are oriented in such a way that when transmitted and reflected through the surfaces of the rotated optical system, their images superpose with that of the first lightvalve. This configuration is equivalent to rotating each lightvalve about its surface normal, e.g., by 45°, and then rotating the entire system by 45° in the opposite direction. Specifically, the rotation of the lightvalves rotates the image, then the rotation of the entire system rotates the image back to the normal direction. Generally, the size of the prism system needs to be increased so that the components are wide enough to collect rays that span the diagonals of the lightvalves.

Figure 6:
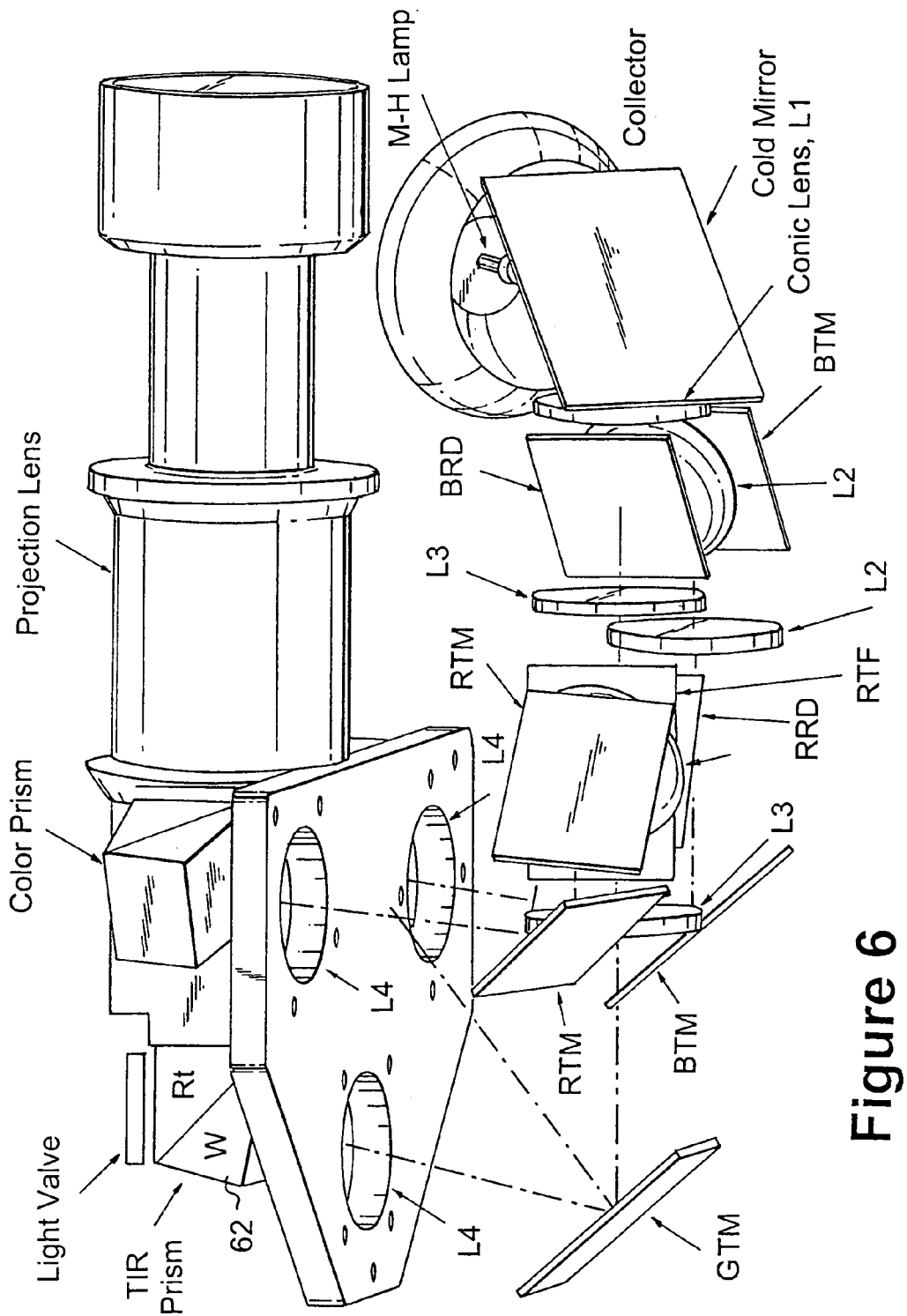
FIG. 6 is a prior art projection systems using known lightvalves which may be adapted for use with the lightvalve of the present invention.

FIG. 6 shows a system published by Burstyn et al. in the 1994 SID Symposium Digest of Technical Papers on page 677 which may be adapted for use in the present invention. The system is oriented at 45° in order to accommodate the tilt directions of the Texas Instruments Digital Micromirror Device (DMD). The system uses Plumbicon prisms to combine the colors. For use in the present invention the total internal reflection (TIR) 62 prisms must be replaced by PBS's.

Figure 7:
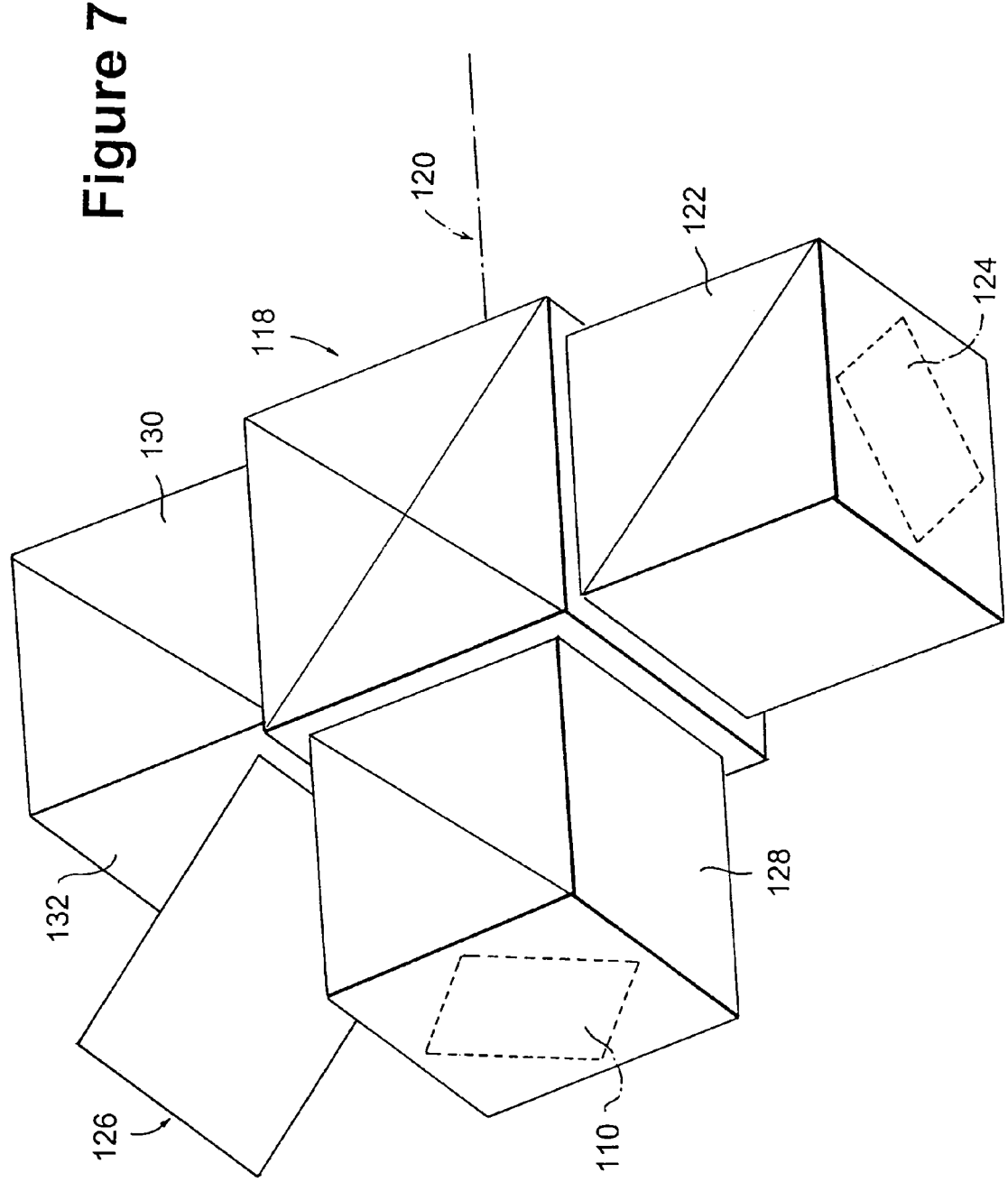
FIG. 7 illustrates an optical configuration of the present invention in the preferred embodiment.

FIG. 7 illustrates an optical system configuration of the present invention in the first preferred embodiment. The configuration illustrated in FIG. 7 includes a system that is rotated by 45° about axis 120, which is the surface normal to lightvalve 110. Though the optical system is rotated, the edges of lightvalve 110 retain the untilted orientation that is desired in the projected image. One color is split off from the illuminator and introduced into PBS 122, providing illumination for lightvalve 124. The two remaining illumination colors are separated by dichroic 126 and introduced into PBSs 128 and 130, whence they illuminate lightvalves 110 and 132. The images reflected from the three lightvalves are recombined by x-prism 118. The images are superposed in a common untilted orientation.

Figure 8:
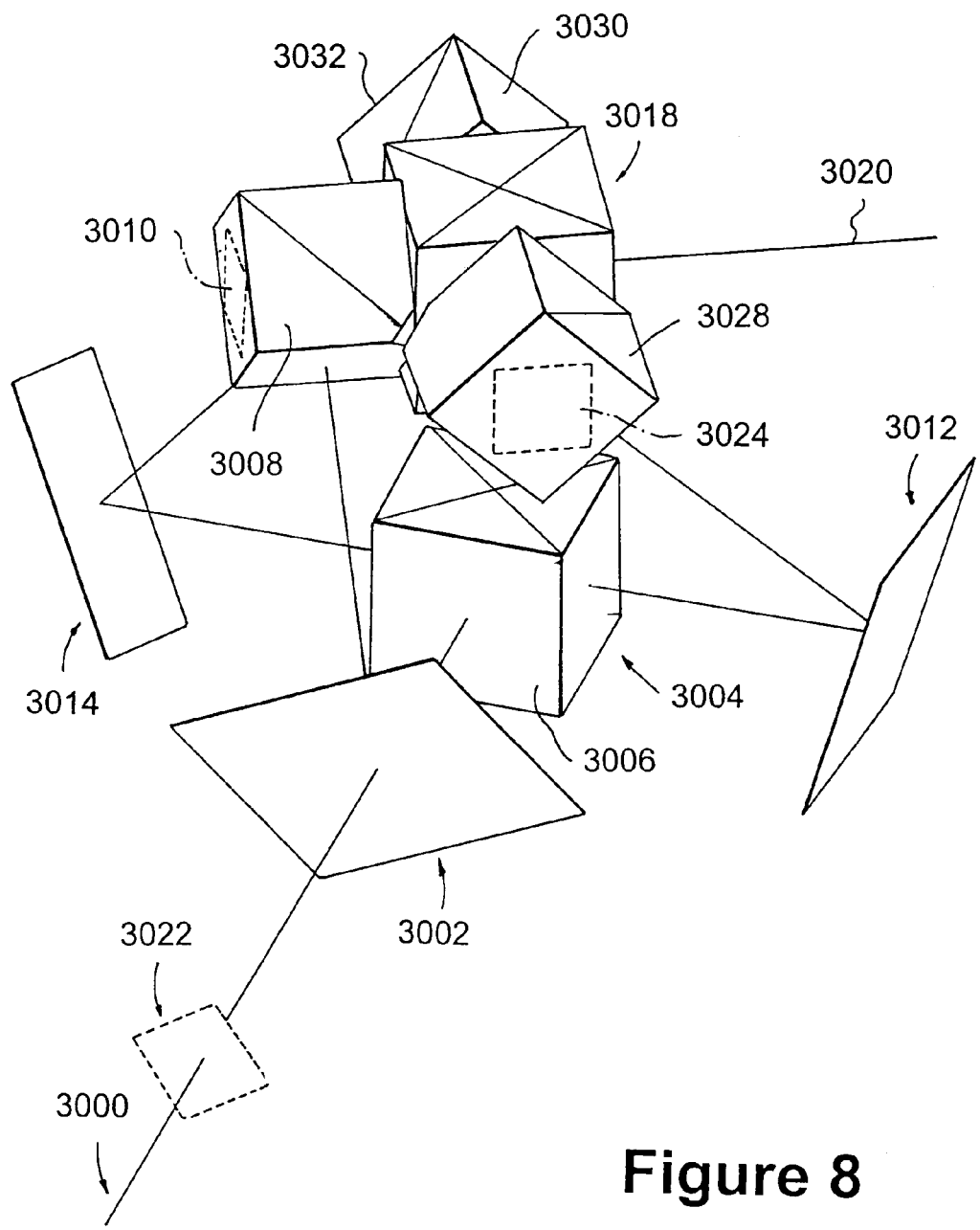
FIG. 8 illustrates an optical configurations of the present invention in which only the PBS cubes are rotated.

Optical configurations may be devised in which only the PBS cubes are rotated, thereby reducing in the manner shown in FIG. 8 the back focal length required in the projection lens. A white light illumination beam 3000 is polarized to pass through a polarizing mirror 3002 made, for example, from a DBEF film. The front face 3006 of x-cube 3004 is coated with a quarterwave retarder (QWP) and green dichroic. These coatings reflect the green illumination back to DBEF mirror 3002 in a polarization which is rotated in order that it reflect from mirror 3002 on the return pass. The green illumination light is thus directed into PBS 3008, whence it illuminates lightvalve 3010. Meanwhile the red and blue image components pass through green dichroic 3006 and a second QWP to be separated by the diagonal dichroics of x-cube 3004. They are then directed by mirrors 3012 and 3014 into PBS's 3028 and 3030, whence they illuminate lightvalves 3024 and 3032. Relay lenses (not shown) equalize the path lengths in the three illumination channels. Dashed outline 3022 shows the orientation that must be taken by the illumination patch along beam 3000. The double bounce in the green channel is necessary in order that the illuminated regions share the appropriate common orientation after recombination by x-cube 3018.

Another embodiment of the invention uses a DBEF reflective polarizer to separate input and output beams, rather than a PBS. DBEF films have their own intrinsic polarization axis. Thus, if the multilayer hypotenuse coatings in the PBS cubes of a conventional system are replaced by DBEF polarizers, the DBEF films can be rotated within the hypotenuse plane to place their pass axes in the desired, e.g., 45° orientation. Such DBEF films can also function as plate polarizers in air.

Figure 9:
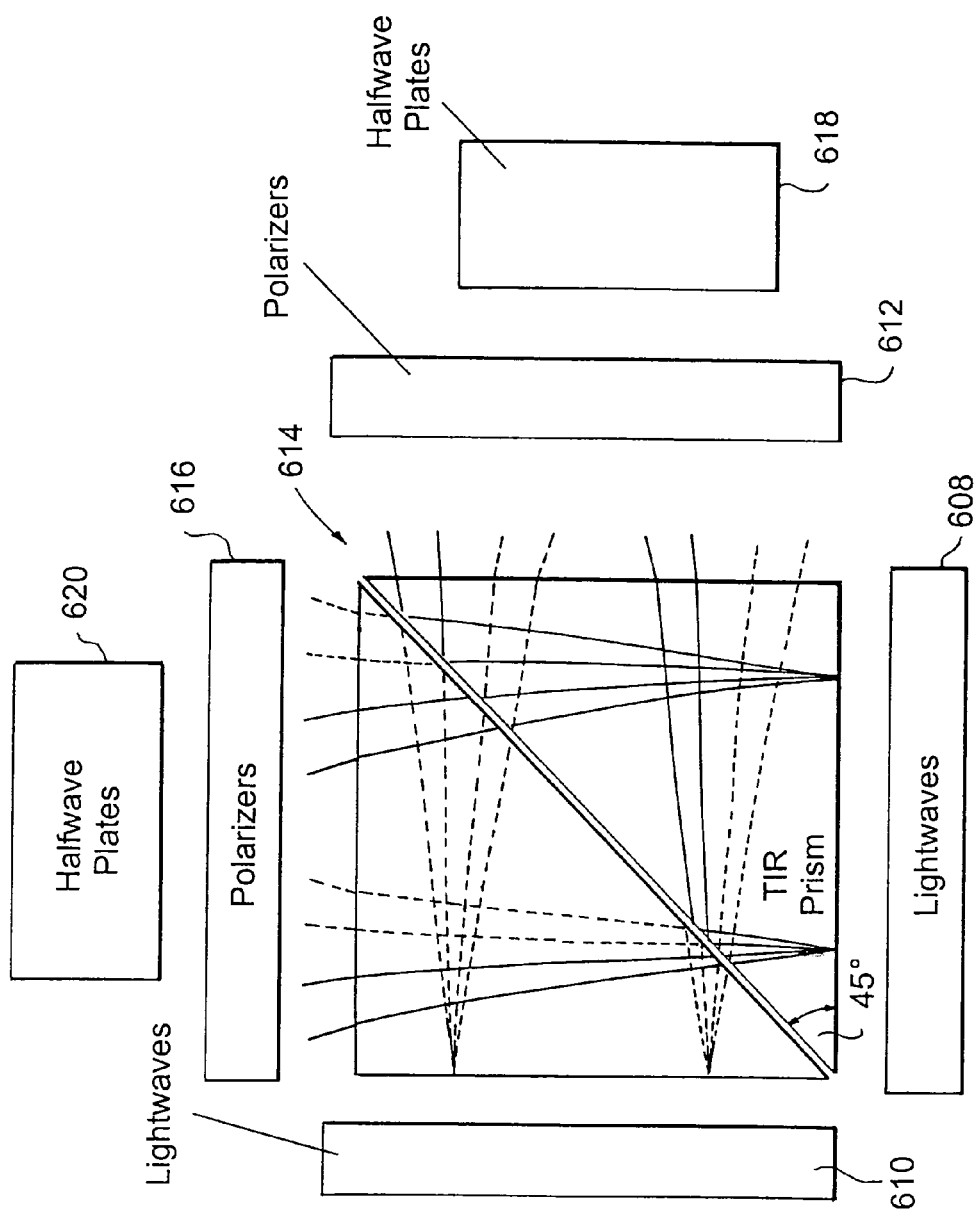
FIG. 9 illustrates a positioning of halfwave plates in a projection system such that the lightvalves of the present invention may be adapted to the system.

In alternate embodiments of the present invention, oblique illumination rather than beamsplitters is used to divide input and output beams. FIG. 9 is an example which was also disclosed in commonly-owned co-pending U.S. patent application Ser. No. 09/085,065 by A. E. Rosenbluth and K. C. Ho entitled "Lightvalve Projection System in Which Red, Green, and Blue Image Subpixels Are Projected from Two Lightvalves and Recombined Using Total Reflection Prisms", and which illustrates a beam dividing element other than beamsplitters. In FIG. 9, halfwave plates 618, 620 are placed behind polarizers 612, 616 in order to adapt the system for lightvalves 608, 610 of the present invention, i.e. to provide illumination in the desired polarization of e.g. 45° orientation. The AR coating on TIR prism 614 must be phase controlled in order to avoid polarization crosstalk.

Figure 10A:
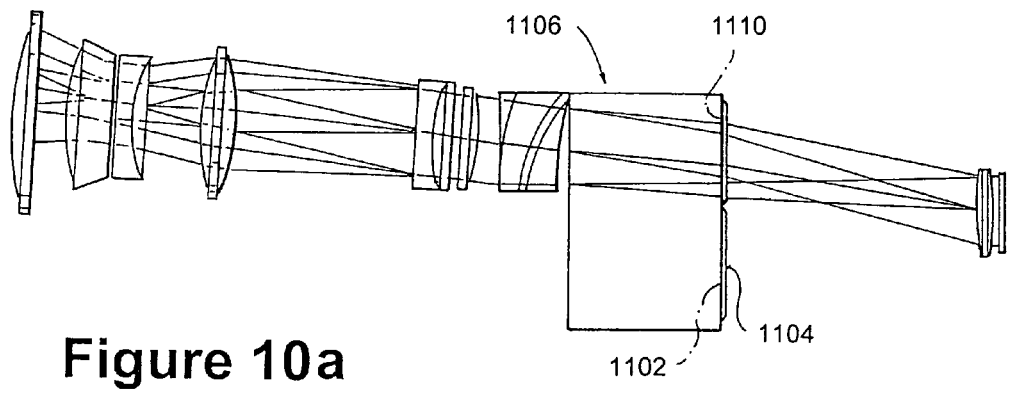
FIG. 10 illustrates a preferred optical system for use with the lightvalves of the present invention.
Figure 10B:
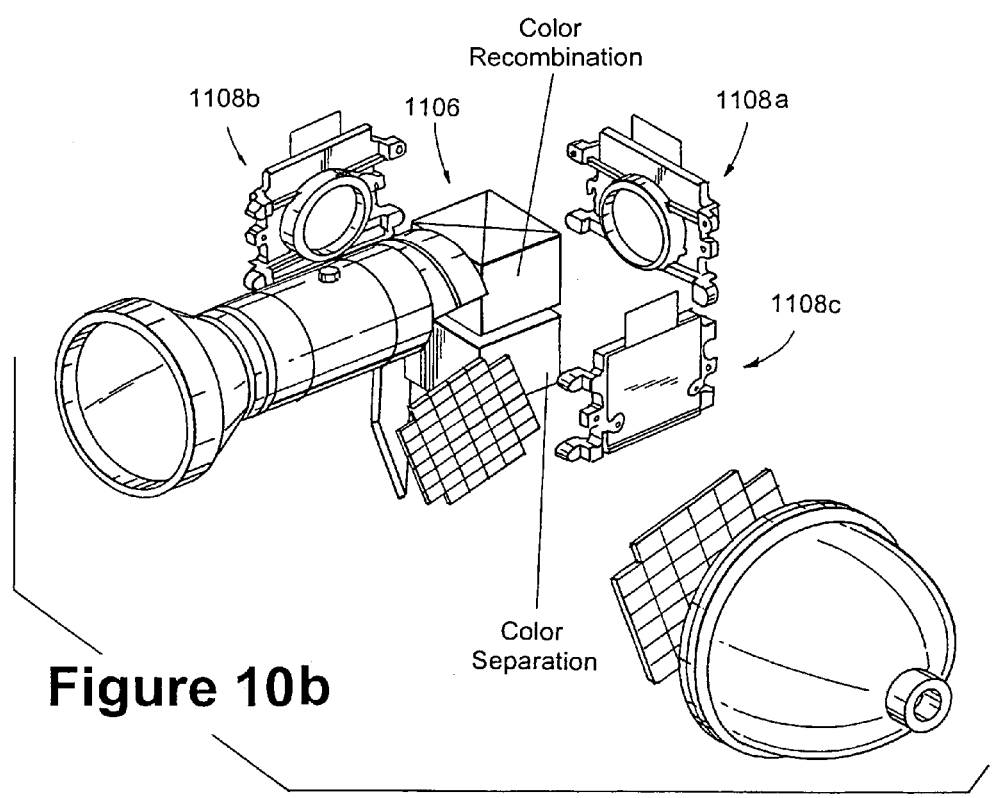

FIG. 10 illustrates another preferred optical system providing oblique illumination, for use with lightvalves of the present invention. The optical system shown in FIG. 10 is published in Proceedings of the 1998 Strategic Display Symposium by M. Bone et al. page 42. A white light beam is split by an x-prism 1106 to illuminate three lightvalves 1108a, 1108b, 1108c at oblique angles. The light is preferably S polarized through the x-prism 1106, but is rotated to the e.g. 45° orientation suitable for lightvalves of the present invention by a halfwave plate 1102 placed behind the input polarizer 1104. The optical system of Bone et al. is modified by a halfwave plate 1102, and by a halfwave plate 1110 behind the collection analyzing polarization which restores the reflected image light to S polarization for recombination in the upper half of the x-prism 1106. The x-cube preferably uses graded dichroics to eliminate color shading which would arise from the divergent propagation through the dichroic coatings.

Figure 11:
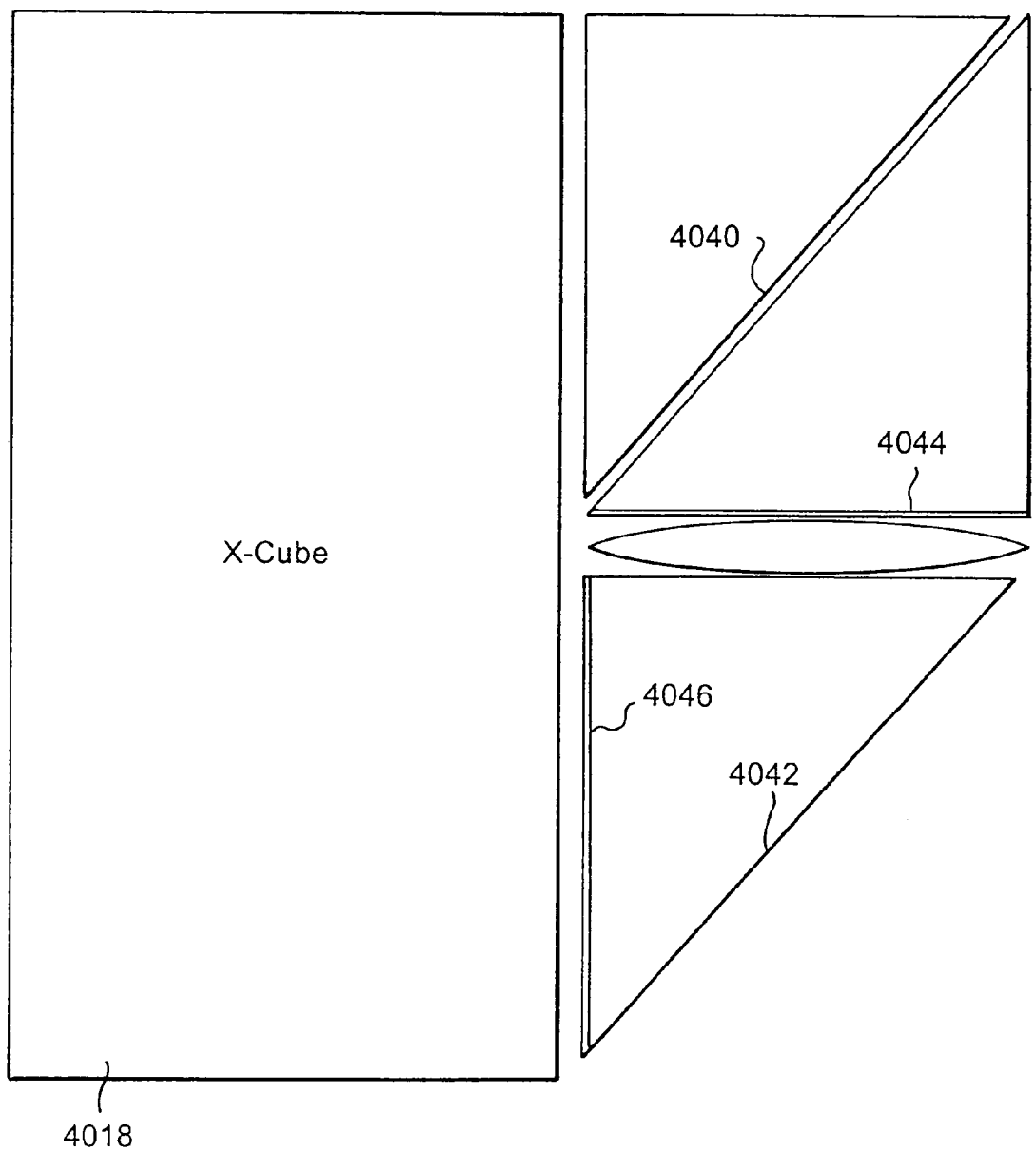
FIG. 11 shows a layout that combines the features of the embodiments of the present invention shown in FIGS. 9 and 10.

FIG. 11 shows a layout that combines the features of the embodiments shown in FIGS. 9 and 10 utilizing oblique illumination. X-cube 4018 is the "twostory" kind, as shown in FIG. 10. TIR reflections 4040 and 4042 are used to introduce light obliquely onto the lightvalves. The phase shift in the AR coatings on surfaces 4040 and 4042 must in conjunction with retarders at 4044 or 4046 correct polarization crosstalk.

Figure 12:
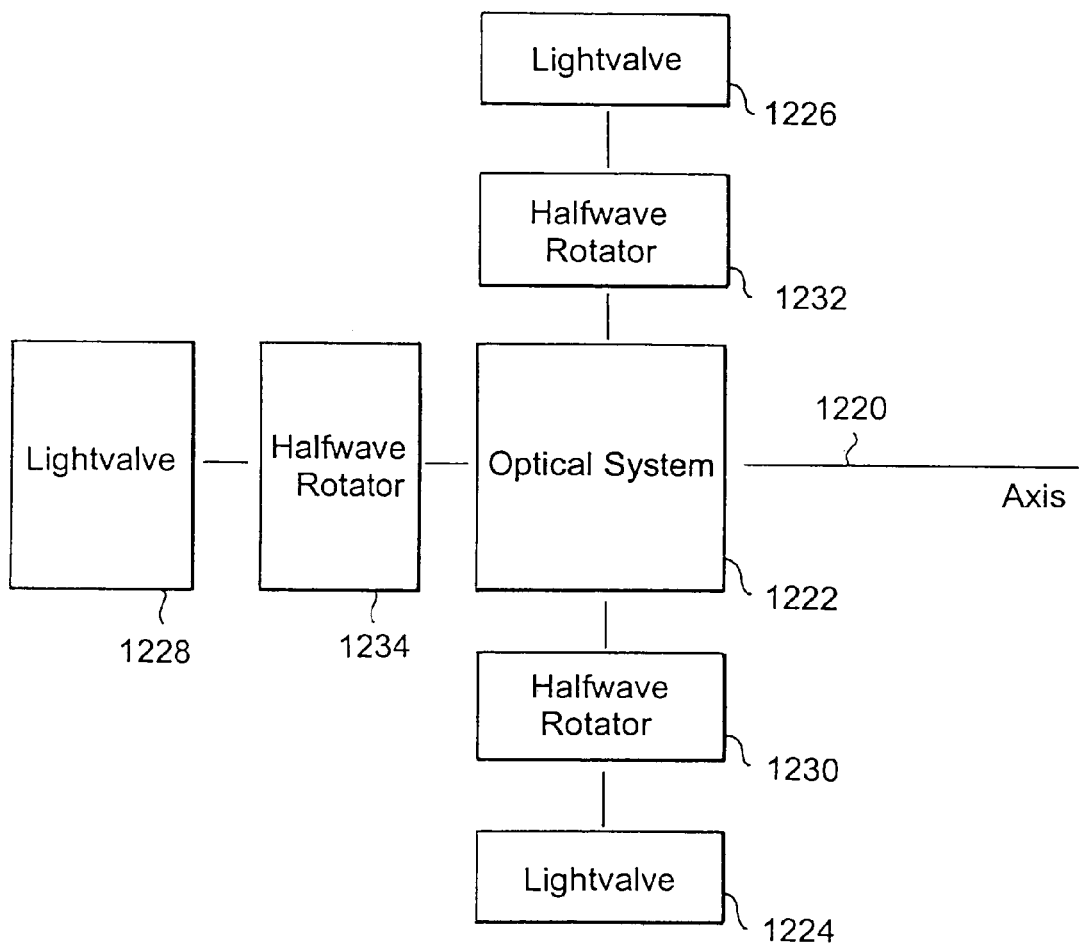
FIG. 12 illustrates an optical configuration of the present invention using several optional methods for rotating the illumination into a desired orientation.

FIG. 12 illustrates another optical configuration used with the present invention to rotate the illumination into the desired, e.g., 45 degrees, orientation. As shown, halfwave rotators 1230, 1232, 1234 are placed between a conventional optical system 1222 and the lightvalves 1224, 1226, 1228 of the present invention. Each waveplate typically has high precision and is achromatized over each color band, so that it does not introduce ellipticity in the illuminating polarization.

Yet another optical configuration is a twist cell, such as a nematic LC layer operating in the Maugin limit, which can be substituted for the above halfwave rotator 1230, 1232, 1234.

Yet another configuration employs an electro-optic rotator as a rotator 1230, 1232, 1234. This has the advantage that its birefringence can be adjusted electrically. In lightvalves for broadband operation, as in color sequential systems, the backplane e-field is only precisely polarized along the rubbing direction for wavelengths in the center of the spectrum; for other wavelength, the polarization is differently rotated, or elliptical. This spectral variation can partially be corrected by adjusting the drive voltage applied to the rotator based on the color band being projected.

Further yet, an optically active medium can be used as a rotator 1230, 1232, 1234. If the active medium has no birefringence (such as crystalline sodium chlorate), small variations in thickness will only introduce small changes in orientation; ellipticity will not be introduced. Lightvalve contrast is less sensitive to induced rotation than it is to induced ellipticity of the same amplitude.

The second class of embodiments of the present invention include modifying the pixel edge configurations. In most applications the pixels of the projected image are stepped out in row, column fashion, i.e. the image pixels are evenly laid out along an x-y grid. Usually the step sizes in x and y are equal. Conventionally the mirror electrodes have a square shape which matches that of image pixels. To maximize reflective area the electrodes are placed quite close to one another.

It remains desirable to maximize reflective area when electrode edges are oriented at angles of e.g. 45° and 135°, notwithstanding that the electrodes must be stepped out in the x,y grid of the image (i.e. along axes at 0° and 90°). This forces a degree of distortion in the shape of pixel electrodes, but such distortion can be tolerated in high resolution applications where the density of pixel is high; in such cases the shape of individual pixels cannot be perceived. FIG. 1 shows an x,y grid of electrodes 1000 which are formed from serrated edges such as 1002 composed of segments oriented at 45° and 135°. Posts 1003 are placed at the intersections of four pairs of such segments.

Figure 2A:
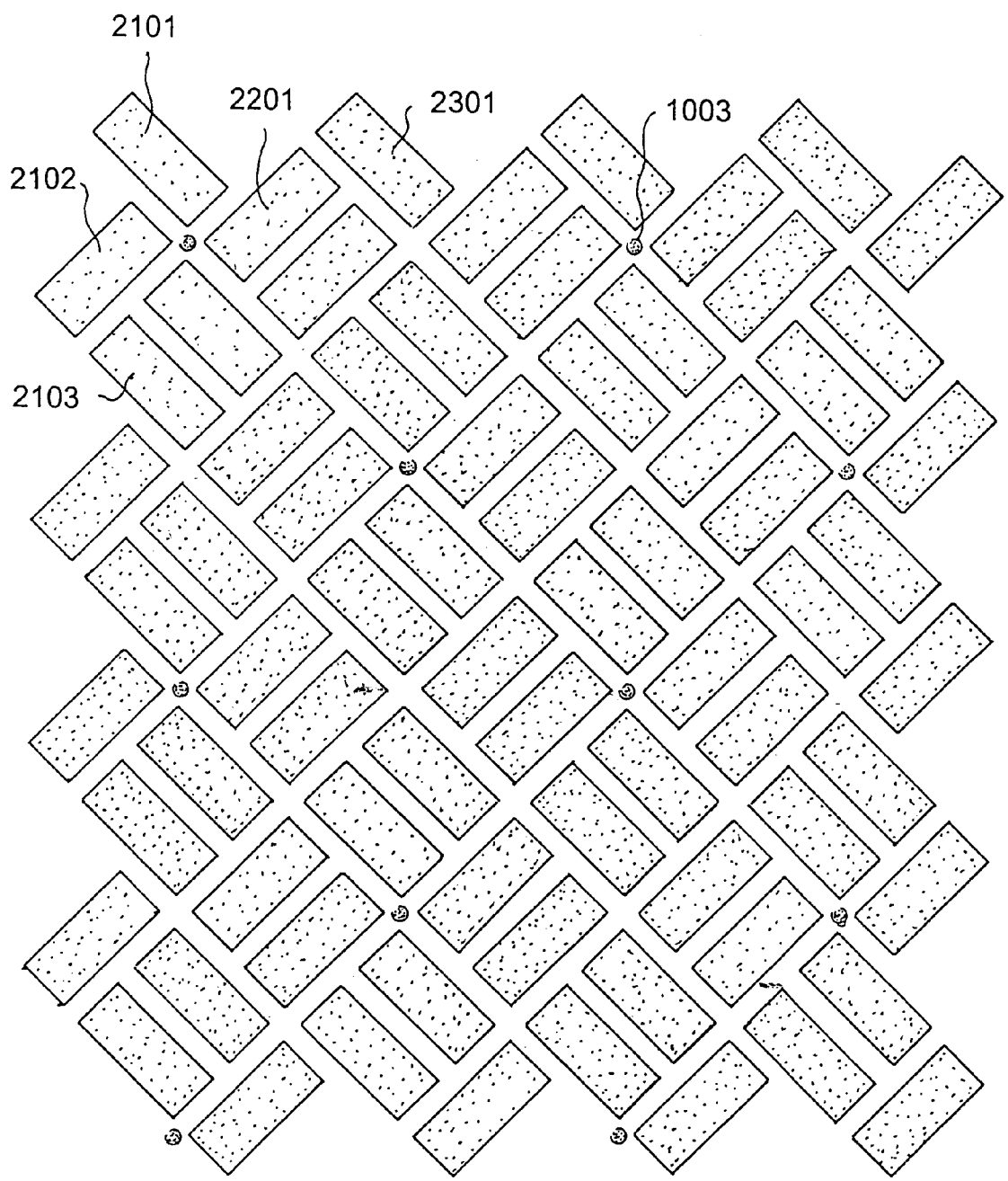
FIG. 2a shows an array of pixel electrodes formed from edges oriented at 45° and 135°.
Figure 2B:
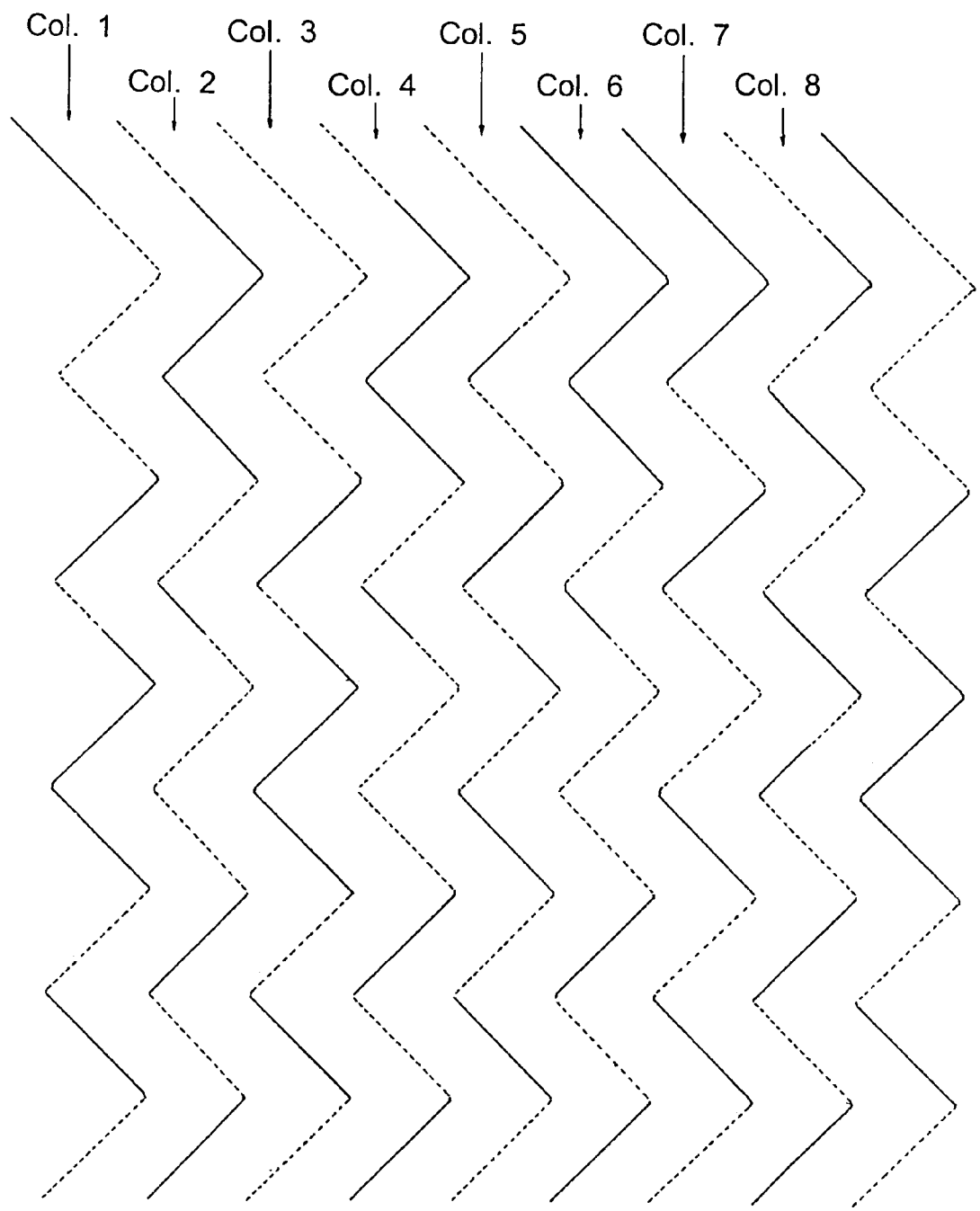

More extreme distortions in electrode shape may be permitted in cases where pixel is very high, or in applications where the displayed images do not contain sharp edges of high contrast, e.g. the displayed images are of natural scenes. FIG. 2a shows an array of pixel electrodes formed from edges oriented at 45° and 135° that is suitable for such applications. Electrodes 2101, 2201, 2301, . . . are in column 1. Posts 1003 are placed at the intersections of four pairs of edges. FIGS. 2b,c,d further illustrate the row, column layout of the FIG. 2a pixel electrodes.

Figure 2D:
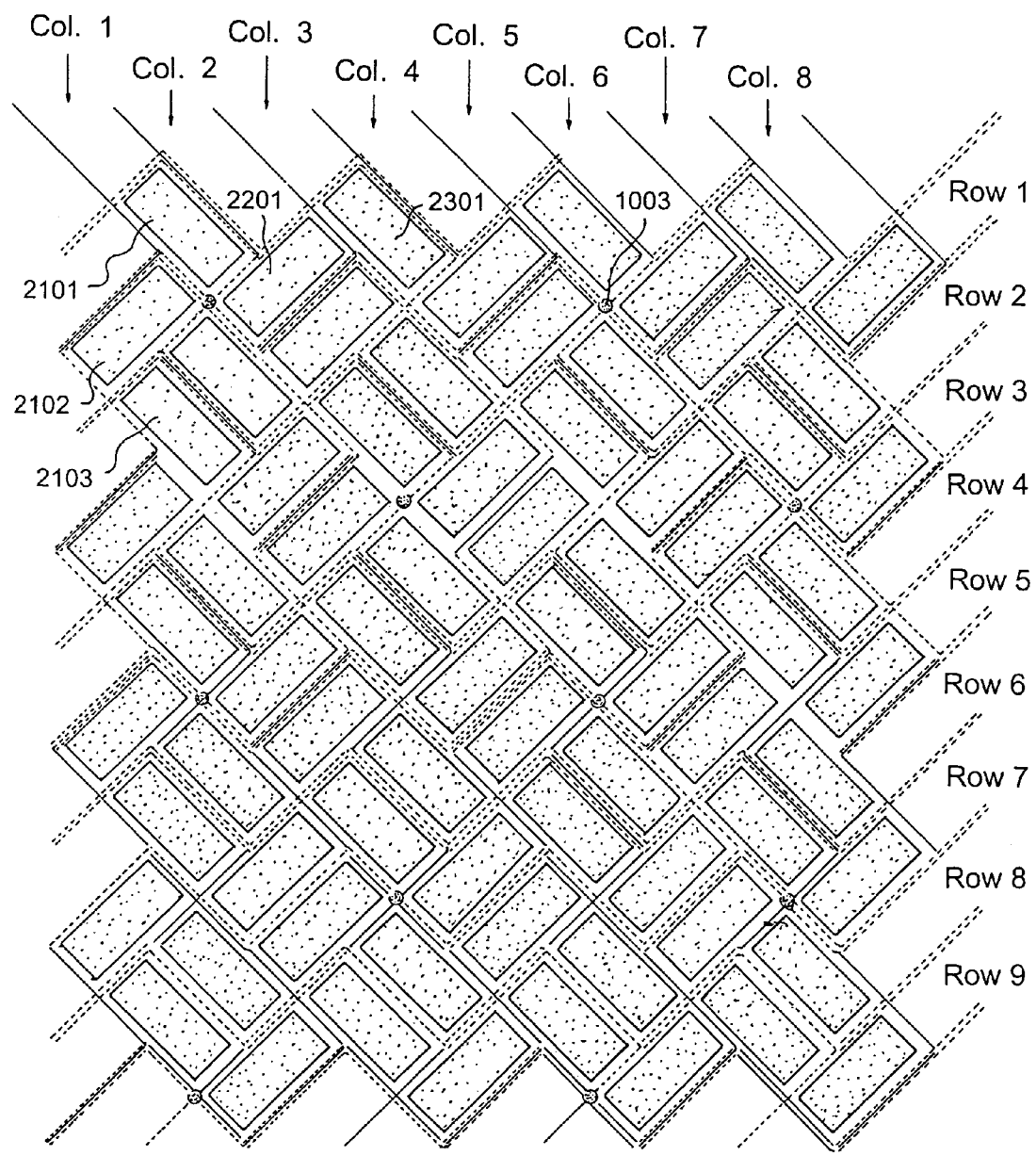
Figure 3:
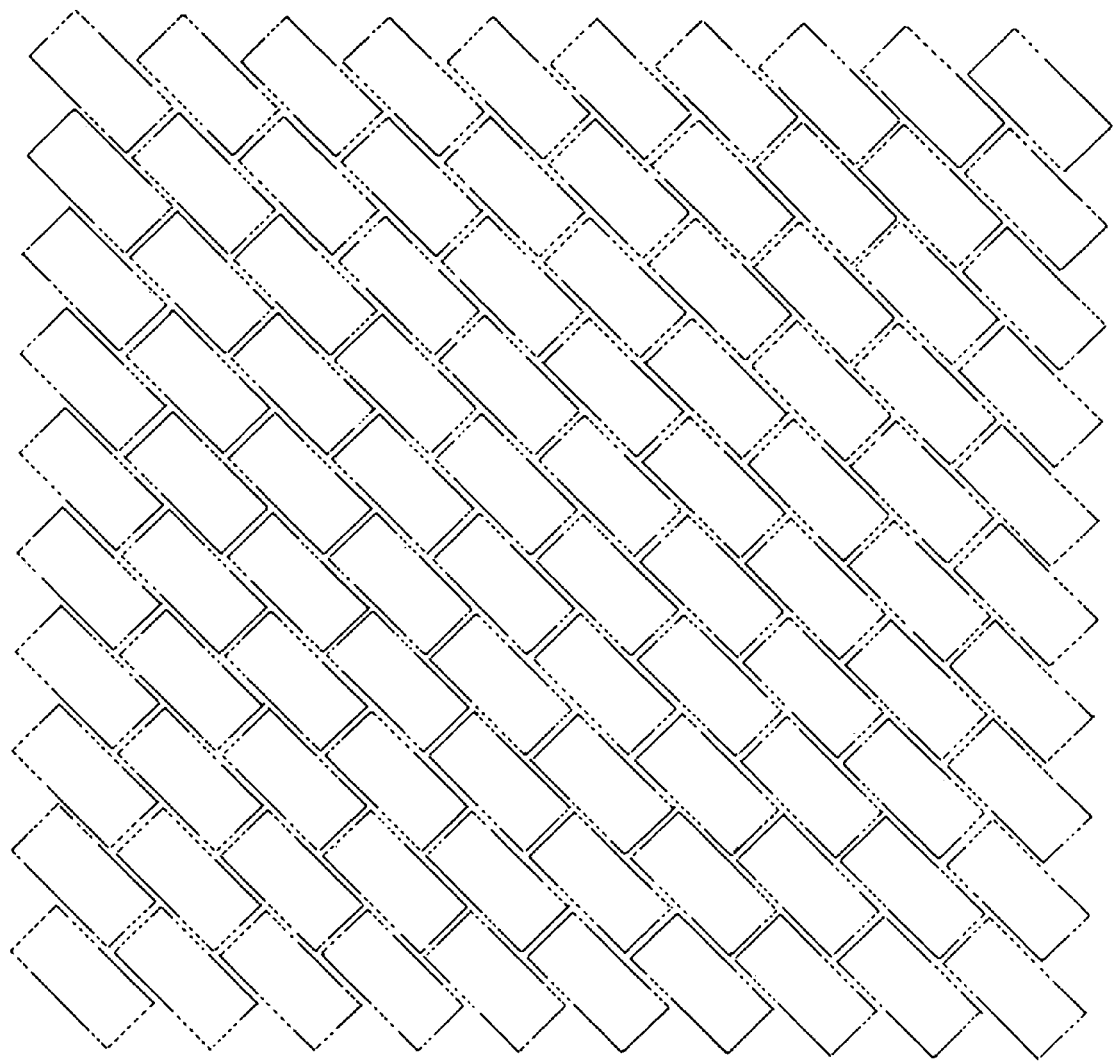
FIG. 3 illustrates an alternative layout of pixel electrodes.

FIG. 3 illustrates an alternative layout of this kind. When the twist angle is 45° and the input polarization is oriented at 0° or 90°, the structures of FIGS. 1,2,3 provide electrode edges that are rectilinear with the polarization which illuminates the lightvalve backplane. For cases where the twist angle is not 45° these layouts can be adjusted to include, for example, segments oriented at 54° and 144°. However, for most purposes, e.g. 9° mismatch that arises between a backplane electric field at 54° orientation and an electrode edge at 45° is not significant.

Figure 4:
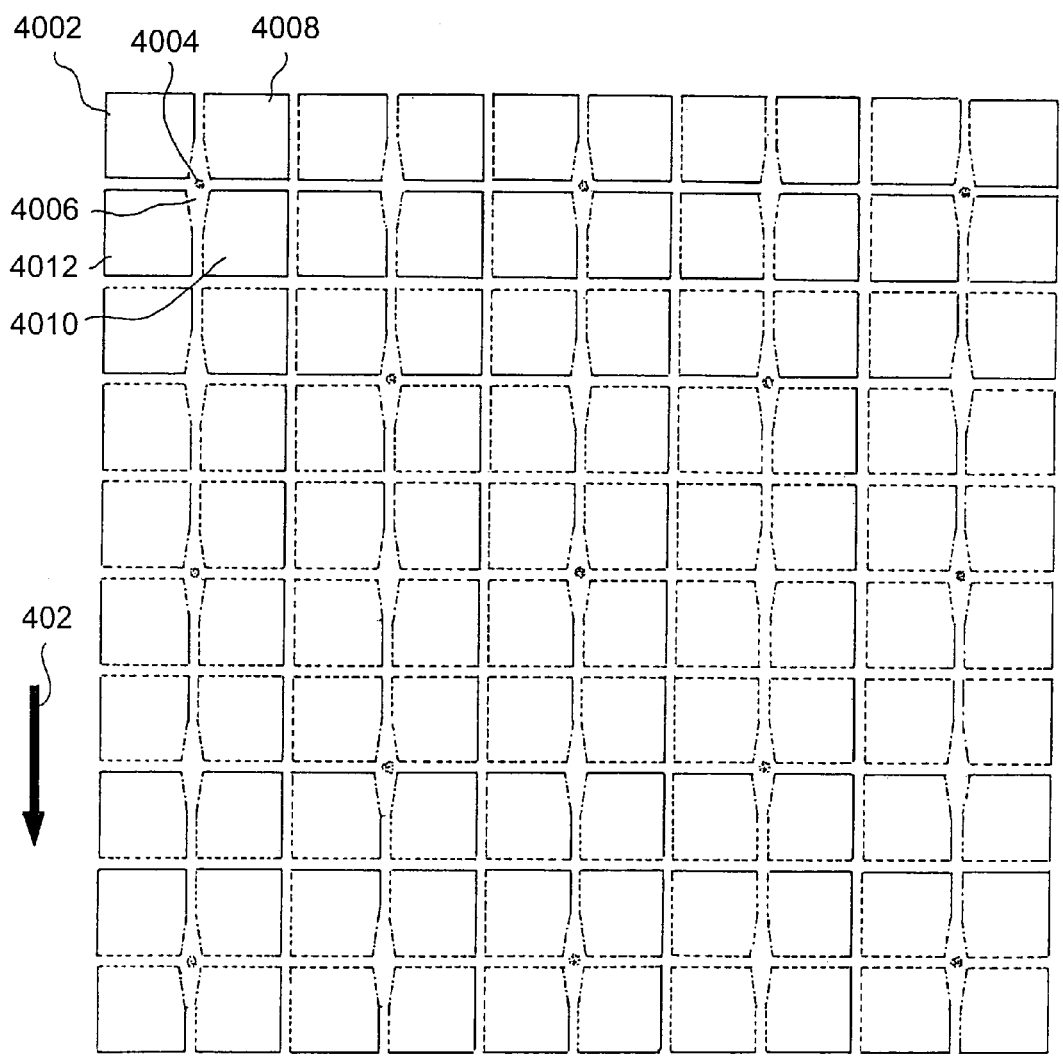
FIG. 4 shows an embodiment wherein one edge in each electrode is slightly sloped in order to retract the reflective pixel away from the disturbed LC which surrounds the posts.

Because of this insensitivity, it is possible to make small adjustments in the orientation of feature edges in the above disclosed embodiments. Consider, for example, the basic embodiment wherein the electrodes are square and the entrance-face LC and incident polarization are rotated by e.g. 45° away from rectilinearity with the vertical and horizontal axes of the image, in order that the polarization at the backplane be aligned with these axes. In this embodiment the electrodes need not be perfectly square because it is not necessary that the electrode edges be oriented at precisely 0° and 90°; only approximate rectilinearity with the backplane polarization is required. FIG. 4 shows an embodiment wherein one edge in each electrode 4002 is slightly sloped in order to retract the reflective pixel away from the disturbed LC which surrounds posts 4004. All pixels are given equal areas in order to maintain uniformity. The arrow 402 indicates the direction of rubbing at the backplane. The region of disturbed LC surrounding each post 4004 is oriented along the rubbing direction, so that it overlays the non-reflective notch-shaped area 4006 between electrodes 4002, 4008, 4010, and 4012.

While the invention has been particularly shown and described with respect to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A projection system comprising:
    an illumination system delivering polarized light to a reflective lightvalve;
    the reflective lightvalve which receives the polarized light from the illumination system, the reflective lightvalve further having a twisted nematic liquid crystal layer that rotates the polarized light as the polarized light exits the liquid crystal layer,
    the reflective lightvalve further including a backplane at one side of the liquid crystal layer,
    the backplane comprising reflective electrodes having edges are that are one of parallel and perpendicular to the director axis of the molecules in the liquid crystal layer when the director axis is projected onto the surface of the backplane, wherein the polarized light beams are polarized in a direction parallel or perpendicular to the director axis.

2. The projection system as claimed in claim 1, wherein the illumination system comprises;
    a polarizing beam splitter having cubic edges rotated for rectilinear positioning with an orientation of the liquid crystal layer.

3. The projection system as claimed in claim 1, wherein the illumination system comprises:
    a polarizing beam splitter having edges oriented at a preselected angle to the reflective lightvalve.

4. The projection system as claimed in claim 3, wherein the preselected angle is greater than zero degrees.

5. The projection system as claimed in claim 1, wherein the projection system includes a plurality of said reflective lightvalve.

6. The projection system as claimed in claim 5, wherein one or more of said plurality of said reflective lightvalves are positioned to have suffice normal of said reflective lightvalves pass through a center of said polarizing beam splitter, the illumination system rotated about the surface normal at a preselected degree of orientation.

7. The projection system as claimed in claim 1, wherein the illumination system comprises;
    a DBEF reflective polarizer for separating input and output light beams, the DBEF reflective polarizer rotated to a preselected degree of orientation.

8. The projection system as claimed in claim 1, wherein the illumination system comprises:
    a plurality of beam dividing elements for separating input and output light beams; and
    a plurality of halfwave plates positioned between the plurality of beam dividing elements and the lightvalve, the plurality of halfwave plates for generating polarized illumination in a preselected polarization orientation.

9. The projection system as claimed in claim 1, wherein the projection system further comprises:
- a halfwave rotator placed between the illumination system and the lightvalve, the halfwave rotator for rotating the polarized light into a preselected orientation.

10. The projection system as claimed in claim 1, wherein the projection system further comprises:
- a twist cell placed between the illumination system and the lightvalve, the twist cell for rotating the polarized light into a preselected orientation.

11. The projection system as claimed in claim 1, wherein the projection system further comprises:
- an optically active medium, placed between the illumination system and the lightvalve, the optically active medium for rotating the polarized light into a preselected orientation.

12. The projection system as claimed in claim 1, wherein the projection system further comprises:
- an electro-optic medium with adjustable birefringence, placed between the illumination system and the lightvalve, the electro-optic medium for rotating the polarized light into an orientation preselected for each color of polarized light received from the illumination system.

* * * * *